US009190649B2

(12) United States Patent
Archer et al.

(10) Patent No.: US 9,190,649 B2
(45) Date of Patent: Nov. 17, 2015

(54) SHAPE MEMORY POLYMER MATERIAL COMPOSITIONS, METHODS AND APPLICATIONS

(75) Inventors: Lynden A. Archer, Ithaca, NY (US); Praveen Agarwal, Uttar Pradesh (IN)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/115,427

(22) PCT Filed: May 4, 2012

(86) PCT No.: PCT/US2012/036429
§ 371 (c)(1),
(2), (4) Date: Feb. 18, 2014

(87) PCT Pub. No.: WO2012/151457
PCT Pub. Date: Nov. 8, 2012

(65) Prior Publication Data
US 2014/0186679 A1    Jul. 3, 2014

Related U.S. Application Data

(60) Provisional application No. 61/482,268, filed on May 4, 2011.

(51) Int. Cl.
| *H01M 2/16*   | (2006.01) |
| *H01M 2/14*   | (2006.01) |
| *H01M 10/0525* | (2010.01) |
| *H01M 10/056* | (2010.01) |
| *C08G 83/00*  | (2006.01) |
| *C08L 101/00* | (2006.01) |
| *C08K 3/36*   | (2006.01) |
| *C08K 9/06*   | (2006.01) |
| *H01M 10/052* | (2010.01) |

(52) U.S. Cl.
CPC .............. *H01M 2/166* (2013.01); *C08G 83/001* (2013.01); *C08L 101/005* (2013.01); *H01M 2/145* (2013.01); *H01M 2/16* (2013.01); *H01M 10/056* (2013.01); *H01M 10/0525* (2013.01); *C08K 3/36* (2013.01); *C08K 9/06* (2013.01); *H01M 10/052* (2013.01)

(58) Field of Classification Search
None
See application file for complete search history.

(56) References Cited

U.S. PATENT DOCUMENTS

| 8,741,486 B1 * | 6/2014 | Jacobsen et al. ............ 429/236 |
| 2006/0024500 A1 | 2/2006 | Seo |
| 2010/0216941 A1 | 8/2010 | Lomasney et al. |
| 2011/0213046 A1 | 9/2011 | Choi |
| 2011/0258826 A1 | 10/2011 | Lendlein et al. |

FOREIGN PATENT DOCUMENTS

| WO | 2008057297     | 5/2008 |
| WO | 2009073287 A2  | 6/2009 |
| WO | 2010030728     | 3/2010 |
| WO | 2010083041 A1  | 7/2010 |
| WO | 2010083041 Al  | 7/2010 |
| WO | 2010085002     | 7/2010 |
| WO | 2012027573     | 3/2012 |

OTHER PUBLICATIONS

Zhang et al; High Shape Memory Polymer Networks Crosslinked by SiO2; Journal of Materials Chemistry; Apr. 11, 2011; 21; pp. 9073-9078.*
Alonso, Rafael Herrera, Single Component Nanocolloids and Nanohybrid Membranes: Synthesis, Characterization and Properties, PhD Thesis, Cornell University, 2007, pp. 1-138.
Rodriguez, Robert et al., The synthesis and properties of nanoscale ioinc materials, Applied Organometallic Chemistry 2010, vol. 24, 581-589.
Argarwal, P., Chopra, M. And Archer, L.A. (2011), Nanoparticle Netpoints for Shape-Memory Polymers, Angew. Chem. Int. Ed., 50: 8670-8673. doi: 10.1002/anie.201103908, Sep. 5, 2011.
Schaefer et al, Electrolytes for high-energy lithium batteries, Appl Nanosci DOI 10.1007/s13204-011-0044-x This article is published with open access at Springerlink.com, Dec. 2, 2011.
Mohr et al, Initiation of shape-memory effect by inductive heating of magnetic nanoparticles in thermoplastic polymers, PNAS, Mar. 7, 2006, vol. 103, No. 10, 3540-3545.
Xu et al, High performance shape memory polymer networks based on rigid nanoparticle cores, PNAS | Apr. 27, 2010 | vol. 107 | No. 17 | 7652-7657; Published online before print Apr. 7, 2010.
Zhang et al, High-strain shape memory polymer networks crosslinked by SiO2, J. Mater. Chem., 2011, 21, 9073.
Chatterji et al, Smart polymeric gels: Redefining the limits of bio-medical devices, Prog. Polym. Sci. 32 (2007) 1083 1122.
Gong et al, Remotely actuated shape memory effect of electrospun composite nanofibers, Acta Biomaterialia 8(2012) 1248-1259.
Lendlein et al, Polymers in Biomedicine and Electronics, Macromol. Rapid Commun. 2010, 31, 1487-1491.
Madbouly et al, Shape-Memory Polymer Composites, Adv Polym Sci (2010) 226: 41-95.

* cited by examiner

*Primary Examiner* — Sarah A Slifka
(74) *Attorney, Agent, or Firm* — William Greener; Alek P. Szecsy; Bond, Schoeneck & King, PLLC

(57) ABSTRACT

A shape memory polymer material composition comprises: (1) a plurality of inorganic core nanoparticles as netpoints to which is connected; (2) a switching segment that comprises a polymer network. The polymer network comprises: (1) a corona component bonded to each inorganic core nanoparticle through a first chemical linkage; (2) a canopy component bonded to each corona component through a second chemical linkage; and (3) a plurality of cross-linking components cross-linking between different canopy components through a third chemical linkage. Given various selections for the inorganic core nanoparticles, the corona component, the canopy component, the cross-linking component, the first chemical linkage, the second chemical linkage and the third chemical linkage, various performance and composition characteristics of the shape memory polymer material compositions may be readily tailored.

24 Claims, 4 Drawing Sheets

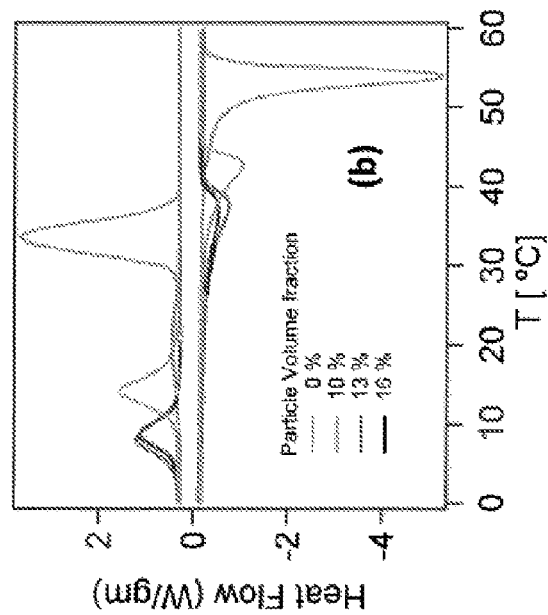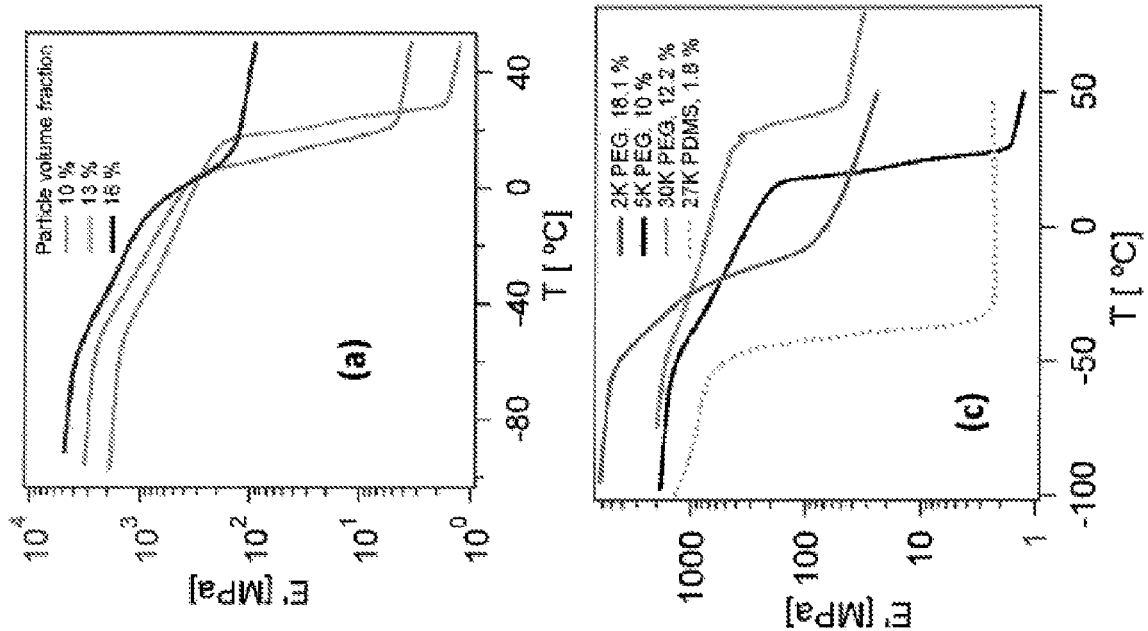
Figure 2

SHAPE MEMORY POLYMER MATERIAL COMPOSITIONS, METHODS AND APPLICATIONS

CROSS-REFERENCE TO RELATED APPLICATION

This application derives priority from, and is related to, U.S. Provisional Patent Application Ser. No. 61/482,268, filed 4 May 2011, and titled Shape Memory Polymer Compositions, Methods and Applications, the content of which is incorporated herein fully by reference.

STATEMENT OF GOVERNMENT INTEREST

The investigations that lead to the embodiments disclosed herein and the invention claimed herein were funded by the United States National Science Foundation under project number DMR-1006323. The United States government has rights in the invention claimed herein.

BACKGROUND

1. Field of the Invention

Embodiments relate generally to shape memory polymer (SMP) material compositions, related methods and related applications. More particularly, embodiments relate to shape memory polymer material compositions, related methods and related applications that provide shape memory polymer material compositions with enhanced performance.

2. Description of the Related Art

Shape memory polymer material compositions represent a class of external stimuli responsive material compositions that have a capability to remember a pre-programmed shape imprinted during preparation or synthesis. Thus, shape memory polymer material compositions may, for example, be shape reformed at a higher temperature to impart a desired temporary shape, and subsequently recovered to an original shape when influenced by a particular external stimulus, such as but not limited to an external thermal stimulus, an external optical stimulus and/or an external magnetic radiation stimulus.

Shape memory polymer material compositions are attractive for a growing variety of applications in diverse fields, where such applications may include, but are not limited to, biomedical component applications and optical component applications.

While shape memory polymer material compositions are thus desirable within various applications due to their permanent shape retention and recovery characteristics within the context of transitory shape deformation, shape memory polymer material compositions are nonetheless not entirely without problems. In that regard, shape memory polymer material compositions do not necessarily provide enhanced or optimal shape memory retention and recovery characteristics within the context of shape memory polymer material compositions that have enhanced mechanical properties, such as but not limited to enhanced storage modulus.

Since a shape memory characteristic may be a desirable characteristic within a polymer material composition that otherwise possesses enhanced mechanical properties, desirable are additional shape memory polymer material compositions with enhanced properties, such as but not limited to enhanced mechanical properties.

SUMMARY

Non-limiting embodiments include a shape memory polymer material composition and a method for preparing the shape memory polymer material composition. A shape memory polymer material composition in accordance with the embodiments includes a plurality of inorganic core nanoparticles each having a capacity to serve as a netpoint for greater than eight polymer chains within a polymer network as a switching segment. Included within the switching segment and attached to each inorganic core nanoparticle is a surface reactive corona component bonded while using a first chemical linkage. Also included within the switching segment and attached to each surface reactive corona component is a surface reactive canopy component bonded while using a second chemical linkage. Finally, the switching segment also includes a plurality of cross-linking components cross-linking between at least two surface reactive canopy components with respect to at least two different inorganic core nanoparticles, bonded while using a third chemical linkage.

Within the context of the shape memory polymer material composition in accordance with the embodiments as described above, the plurality of inorganic core nanoparticles chemically linked to the polymer material provides the basic shape characteristics, and possibly also some materials properties characteristics, of a shape memory polymer material composition in accordance with the embodiments.

Within the context of the shape memory polymer material composition in accordance with the embodiments as described above, the first chemical linkage, the second chemical linkage and the third chemical linkage, as well as the corona component, the canopy component and the cross-linking component, may each be selected to provide desirable properties within the shape memory polymer material composition, in addition to shape memory properties within the shape memory polymer material composition.

The non-limiting embodiments of a shape memory polymer material composition as described above may be further optimized for use as an electrolyte or separator within a lithium battery construction (i.e., either a lithium ion battery construction or a lithium metal battery construction) by further modifications or limitations that include at least one of: (1) a lithium ion dopant doping a portion of the corona component; (2) the canopy component including both a hydrophilic polymer component and a hydrophobic polymer component; and (3) the cross-linking component have a molecular weight from about 50 to about 100000 amu, more preferably from about 100 to about 10000 amu.

A particular method for preparing a shape memory polymer material composition in accordance with the embodiments derives from the foregoing shape memory polymer material composition in accordance with the embodiments.

A particular shape memory polymer material composition in accordance with the embodiments includes a plurality of inorganic core nanoparticles, each inorganic core nanoparticle having a capacity to serve as a netpoint for greater than eight polymer chains within a polymer network as a switching segment. This particular shape memory polymer material composition also includes the polymer network bonded to the plurality of inorganic core nanoparticles and comprising: (1) a corona component bonded to each core nanoparticle through a first chemical linkage; (2) a canopy component bonded to each corona component through a second chemical linkage; and (3) a plurality of cross-linking components cross-linking between separate canopy components on separate inorganic core nanoparticles through a third chemical linkage.

A particular method for preparing a shape memory polymer material composition in accordance with the embodiments includes reacting a plurality of inorganic core nanoparticles with a corona forming material to provide a plurality of surface functional corona bonded inorganic core nanoparticles that include a first chemical linkage. This particular method also includes reacting the plurality of surface functional corona bonded core nanoparticles with a canopy-forming material to provide a plurality of surface functional corona bonded and surface functional canopy bonded inorganic core nanoparticles that include a second chemical linkage in addition to the first chemical linkage. This particular method also includes reacting the plurality of surface functional corona bonded and surface functional canopy bonded inorganic core nanoparticles with a cross-linking material to provide cross-linked surface functional corona bonded and surface functional canopy bonded inorganic core nanoparticles through a third chemical linkage.

BRIEF DESCRIPTION OF THE DRAWINGS

The objects, features and advantages of the embodiments are understood within the context of the Detailed Description of the Embodiments, as set for the below. The Detailed Description of the Embodiments is understood within the context of the accompanying drawings, that form a material part of this disclosure, wherein:

FIG. 2(a) shows dynamic mechanical analysis (DMA) spectra of Storage Modulus versus Temperature as a function of inorganic core nanoparticle volume fraction for a plurality of shape memory polymer material compositions in accordance with the embodiments.

FIG. 2(b) shows differential scanning calorimetry (DSC) spectra of Heat Flow versus Temperature as a function of inorganic core nanoparticle volume fraction for a plurality of shape memory polymer material compositions in accordance with the embodiments.

FIG. 2(c) shows dynamic mechanical analysis (DMA) spectra of Storage Modulus versus Temperature as a function of canopy polymer material composition for a plurality of shape memory polymer material compositions in accordance with the embodiments.

DETAILED DESCRIPTION OF THE EMBODIMENTS

Figure 1:
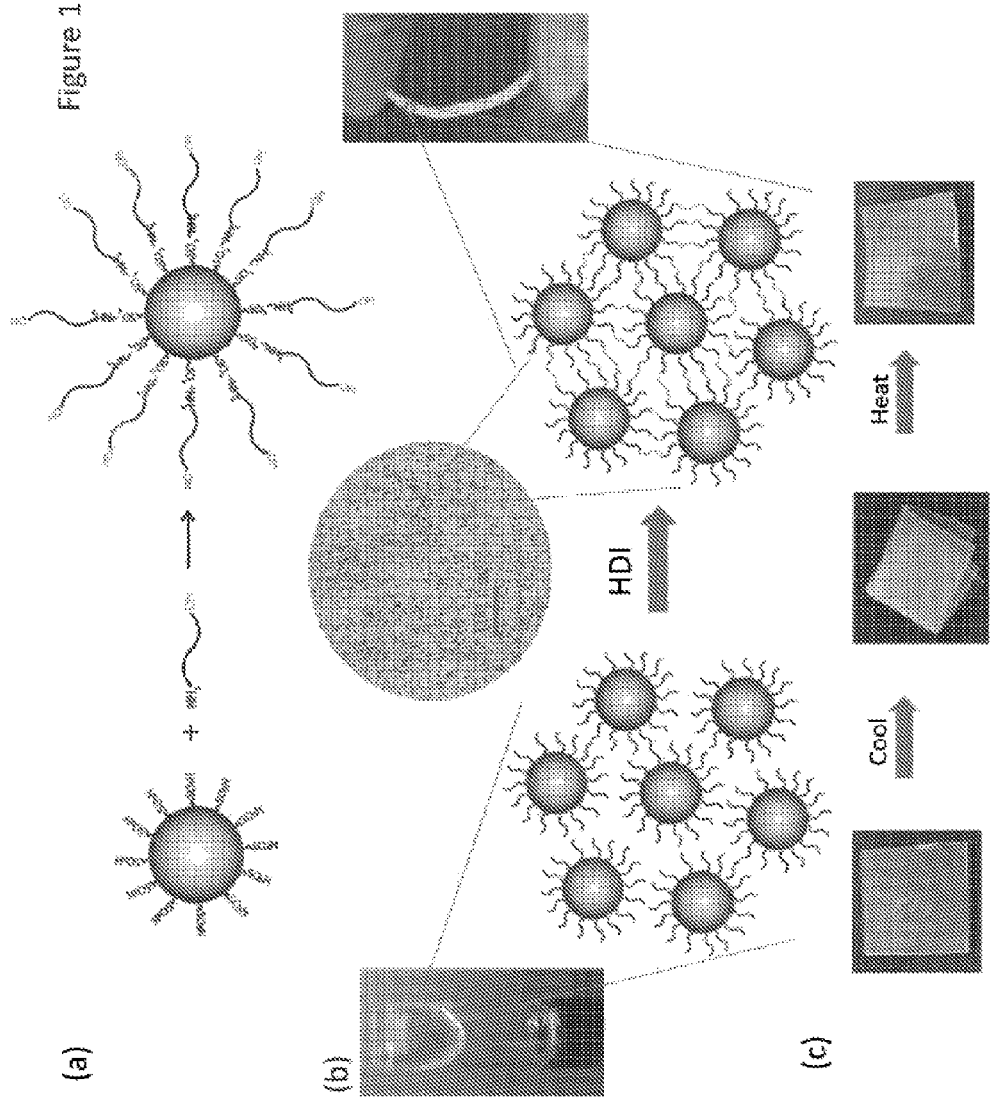
FIG. 1(a) and FIG. 1(b) show sequential schematic diagrams of a reaction scheme for preparing a shape memory polymer material composition in accordance with the embodiments.
FIG. 1(c) shows a photograph of a shape memory polymer material composition in accordance with the embodiments undergoing an external thermal stimulus deformation and an external thermal stimulus recovery.

Embodiments include a shape memory polymer material composition and a method for preparing the shape memory polymer material composition. A shape memory polymer material composition in accordance with the embodiments includes a plurality of inorganic core nanoparticles, each capable of serving as a netpoint for greater than eight polymer chains within a polymer (i.e., typically organic) switching segment that also comprises the shape memory polymer material composition. The switching segment includes a surface reactive corona component attached to each inorganic core nanoparticle through a first chemical linkage. In turn, each of the surface reactive corona components has attached thereto through a second chemical linkage a surface reactive canopy component. Finally, the switching segment also includes a cross-linking component that cross-links between separate surface reactive canopy components with respect to separate inorganic core nanoparticles, while using a third chemical linkage.

The inorganic core nanoparticles, which as noted above serve as netpoints within the shape memory polymer material composition in accordance with the embodiments, provide shape characteristics and dimensional stability characteristics absent compromise of other shape memory transition characteristics of the shape memory polymer material composition in accordance with the embodiments.

In addition, the inorganic core nanoparticles, the corona component, the canopy component and the cross-linking component, as well as the first chemical linkage, the second chemical linkage and the third chemical linkage, may provide additional characteristics within a shape memory polymer material composition in accordance with the embodiments, in addition to shape memory characteristics within the shape memory polymer material composition. Such additional characteristics within the shape memory polymer composition may include, but are not necessarily limited to, biocompatibility characteristics and environmental degradation characteristics.

I. General Structural Considerations for a Shape Memory Polymer Material Composition in Accordance with the Embodiments Within the shape memory polymer material compositions in accordance with the embodiments, each of a plurality of inorganic core nanoparticles serves as a netpoint having a capacity of bonding greater than eight polymer chains as components within a switching segment that also comprises the shape memory polymer material composition. These inorganic core nanoparticle netpoints provide the basic structural characteristics of a shape memory polymer material composition in accordance with the embodiments. In the particular shape memory polymer material compositions in accordance with the embodiments, each inorganic core nanoparticle netpoint may in fact serve as a netpoint terminal junction for up to at least about several thousand polymer chains that serve as part of a switching segment that comprises: (1) a corona component; (2) a canopy component; and (3) cross-linking components, within the shape memory polymer material composition in accordance with the embodiments.

While not limiting the embodiments, it is proposed that the particular network design of a shape memory polymer material composition in accordance with the embodiments may lead to a dramatic increase in an elastic modulus of a shape memory polymer material composition, without a loss of sharpness in a transition temperature or shape memory characteristics of the shape memory polymer material composition. Moreover, insofar as the inorganic core nanoparticle netpoints are functional inorganic nanostructures, the design of shape memory polymer material compositions in accordance with the embodiments provides for preparation (i.e., synthesis) of shape memory polymer material compositions with tunable physical properties, transition temperatures and stimuli response.

Shape memory polymer material compositions may generally be described within the context of the two elements of netpoints and switching segments. As noted above, netpoints are typically the connection points for polymer chains in a switching segment within a shape memory polymer material composition, and the netpoints are typically responsible for determining the permanent shape of the shape memory polymer material composition. Within the embodiments, the switching segments comprise polymer chains incorporated into a network and bonded to the netpoints. Such switching segments are responsible for the shape memory effect as may be due to the entropic elasticity of the polymer chains. Within the embodiments, the switching segments may be bonded to the netpoints using any of several types of bonding, including but not limited to ionic bonding and covalent bonding, although covalent bonding is particularly common, and preferred.

Within the context of the embodiments, polymer chains as switching segment elements may be chemical in nature, as in covalently connected polymer chains in cross-linked polymer networks.

In accordance with the embodiments, polymer chains may also exist as physical cross-links, as may be realized in block copolymer based shape memory polymer material compositions.

II Materials Considerations for Shape Memory Polymer Material Compositions in Accordance with the Embodiments In accordance with description above, a shape memory polymer material composition in accordance with the embodiments includes a plurality of inorganic core nanoparticles. To each of these inorganic core nanoparticles is attached a surface reactive corona component through a first chemical linkage, as part of a switching segment network. In turn to each surface reactive corona component is attached a surface reactive canopy component through a second chemical linkage, as an additional part of the switching segment network. Finally, a cross-linking component uses a third chemical linkage to cross-link between the surface reactive canopy components with respect to separate inorganic core nanoparticles, and also as part of the switching segment network.

Within the context of the embodiments, the inorganic core nanoparticles that comprise in part the shape memory polymer material composition in accordance with the embodiments may comprise inorganic nanoparticle materials selected from the group including but not limited to metal, metal alloy, metal oxide, metal hydroxide, metal nitride, metal oxynitride, metal boride, metal boronitride, metal sulfide, metal fluoride and related ceramic inorganic core nanoparticle materials, both of stoichiometric composition and of non-stoichiometric composition. Commonly, but not exclusively, the inorganic core nanoparticles comprise a metal oxide material, and in particular a silicon oxide material (which may be stoichiometric (i.e., a silica material) or non-stoichiometric). Thus, under at least such circumstances of stoichiometric content, the inorganic core nanoparticles may inherently consist of, or may alternatively inherently consist essentially of, an inorganic material. Typically, the inorganic core nanoparticles have a diameter dimension from about 5 to about 1000 nanometers, and more preferably from about 10 to about 100 nanometers. The inorganic core nanoparticles can also exist in a plurality of shapes (i.e., spheres, cubes, ellipsoids, tubes, rods) and mass distributions (i.e., solid, hollow, core-shell, rattles), while present at a concentration from about 1 to about 50 volume percent.

Within the context of the embodiments, the corona component may comprise any of several types of multiply chemical reactive materials that use one type of chemical functionality to bond to the inorganic core nanoparticles while presenting a different type of chemical functionality for further surface reaction when bonded to the inorganic core nanoparticles. Thus, the corona component may typically comprise a coupling agent (or a reaction product of the coupling agent) such as but not limited to an alkoxysilane coupling agent, or a functional organic acid coupling agent.

Within the context of the embodiments, the canopy component may also comprise any of several types of multiply chemical reactive materials (or reaction products of the multiply chemically reactive materials) that use one type of chemical functionality to bond to the surface reactive corona component while presenting a different type of chemical functionality for still further surface reaction when bonded to the surface reactive corona component. Thus, the canopy component in a sense also comprises a coupling agent, but the canopy component may typically comprise a different chemical composition (i.e., often including a longer polymer chain that may include intermediate reactive functionality) in comparison with the corona component.

Within the context of the embodiments, the cross-linking component may comprise a symmetrically bifunctional molecule (or reaction product of the symmetrically bifunctional molecule) that symmetrically bonds to two separate canopy components.

Within the context of the foregoing descriptions, the corona component, the canopy component and the cross-linking component typically comprise different chemical materials. In addition, the first chemical linkage, the second chemical linkage and the third chemical linkage may each independently be selected from the group including but not limited to siloxane linkages, ester linkages, amide linkages, sulfonamide linkages, urethane linkages, epoxide linkages and urea linkages. Typically, each of the first chemical linkage, the second chemical linkage and the third chemical linkage will comprise different chemical linkages, but alternatively the embodiments do not preclude any two, or all three, of the first chemical linkage, the second chemical linkage and the third chemical linkage comprising the same chemical linkage or chemical functionality.

Within the context of the particular embodiment as described above and further below: (1) the inorganic core nanoparticle netpoints comprise silica particles; (2) the corona component comprises (or results from reaction of) a sulfonic acid functional alkoxysilane coupling agent; (3) the canopy comprises (or results from reaction of) an α-amine-ω-hydroxy functional polyethylene glycol material; and (4) the cross-linking component comprises (or results from reaction of) a symmetric diisocyanate. Thus, within the context of the foregoing materials choices for the inorganic core nanoparticles, the corona component, the canopy component and the cross-linking component within the described shape memory polymer material composition: (1) the first chemical linkage comprises a siloxane linkage; (2) the second chemical linkage comprises a sulfonamide linkage; and (3) the third chemical linkage comprises a urethane linkage.

As is illustrated in FIG. 1(a), the inorganic core nanoparticles in particular when comprised of a silica material or an alternative metal oxide material further include a surface reactive functional corona which as illustrated in FIG. 1(a) comprises a sulfonic acid surface reactive functional corona, although such sulfonic acid surface reactive functionality does not limit the embodiments. In order to prepare the sulfonic acid surface reactive functional corona silica nanoparticles as illustrated in FIG. 1(a) from surface non-reactive functional corona silica nanoparticles one may simply react the surface non-reactive functional corona silica nanoparticles with a sulfonic acid functional alkoxysilane coupling agent, as described in further detail below.

As is further illustrated in FIG. 1(a), the sulfonic acid surface reactive functional corona silica inorganic core nanoparticles are further reacted with an α-amino-ω-hydroxy material (and more particularly an α-amino-ω-hydroxy polyethylene glycol material) to provide an hydroxyl surface reactive functional canopy attached to the sulfonic acid surface reactive functional corona component through a sulfonamide linkage as a second linkage.

Finally, the embodiments provide for synthesis of a hybrid polymeric network shape memory polymer material compositions in accordance with the embodiments by interconnecting the free hydroxyl ends of the surface reactive functional canopy components with respect to separate canopies located attached to separate inorganic core nanoparticles. To that end, the embodiments provide for further reaction of the hydroxyl functional surface reactive functional canopy component within the context of a hexamethylene diisocyanate cross-linking component (through a urethane linkage as a third chemical linkage) as illustrated in FIG. 1(b) to provide a shape memory polymer material composition in accordance with the embodiments.

It is anticipated that as many as 1-2 polymer chains per square nanometer inorganic core nanoparticle surface area may be created using the foregoing synthetic approach to preparing shape memory polymer material compositions in accordance with the embodiments, which correlate with up to about 300 to about 600 switching segment polymer chains per inorganic core nanoparticle in a 10 nm inorganic core particle size.

As illustrated in FIG. 1(c), shape memory polymer material compositions prepared in accordance with the embodiments manifest shape memory properties, wherein they may be cooled to retain a transient shape, and when heated again quickly recover an original fixed shape.

Thus, within the context of FIG. 1(a), FIG. 1(b) and FIG. 1(c) the embodiments illustrate shape memory polymer material compositions within the context of a relatively simple material composition comprised of a (preferably) silica inorganic core nanoparticle, a sulfonic acid surface reactive functional corona attached to the silica inorganic core nanoparticle (through a siloxane linkage as a first chemical linkage), a hydroxyl functional surface reactive functional canopy attached to the sulfonic acid surface reactive functional corona (through a sulfonamide linkage as a second chemical linkage) and a cross-linking component cross-linking between separate hydroxyl surface reactive functional canopy components (through a urethane linkage as a third chemical linkage). A desirable characteristic of the foregoing shape memory polymer material composition in accordance with the embodiments is that the inherent biocompatibility of the polyethylene glycol canopy component and the silica inorganic core nanoparticle netpoints immediately renders them attractive candidates for biomedical applications.

III Physical Measurements

FIG. 2(a) shows a dynamic mechanical analysis (DMA) spectral graph of Storage Modulus versus Temperature for shape memory polymer material compositions prepared using polyethylene glycol with canopy molecular weight of 5000 g/mol and a polydispersity index Mw/Mn=1.06. The inorganic core nanoparticle content of these shape memory polymer material compositions may be facilely tuned by changing the number of switching segment polymer chains attached to each inorganic core nanoparticle netpoint, and further characterized by thermogravimetric analysis (TGA). It is seen from FIG. 2(a) that the addition of inorganic core nanoparticles results in a significant increase in both a rubbery modulus (i.e., at greater than about zero degrees Celsius) and a glassy modulus (i.e., at less than about zero degrees Celsius), and that there is a systematic increase in either modulus with increasing inorganic core nanoparticle netpoint volume fraction. (i.e., both the left hand side and the right hand side of FIG. 2(a) illustrate in decreasing order from top to bottom 16% volume fraction, 13% volume fraction and 10% volume fraction silica inorganic core nanoparticle netpoint volume fraction). At a moderate inorganic core nanoparticle volume fraction of 16 percent, the rubbery modulus of the shape memory polymer material composition is of order 100 MPa at room temperature.

FIG. 2(b) shows differential scanning calorimetry (DSC) spectra graphs for the same shape memory polymer material compositions whose dynamic mechanical analysis spectra graphs are illustrated in FIG. 2(a), and also a shape memory polymer material composition absent any inorganic core nanoparticles. The differential scanning calorimetry spectra illustrate that the transition temperature, $T_{trans}$, for the shape memory polymer material composition is due to the melt/crystallization transition of polyethylene glycol polymer chains anchored to the silica inorganic core nanoparticle netpoints. During a cooling cycle (i.e., the upper curve) crystallization occurs in a temperature range of about 10 to about 15 degrees Celsius for the 16% volume and 13% volume samples (which largely overlap), and the 10% volume sample. During the heating cycle (i.e., the lower curve), the melting transition appears within the temperature range from about 35 to about 45 degrees Celsius (with the same ordering as above), which is close to physiological temperatures.

As evident from both the dynamic mechanical analysis spectra and the differential scanning calorimetry spectra, a transition from a rubbery state to a glassy state is very sharp within shape memory polymer material compositions in accordance with the embodiments. This is desirable since a sharp transition temperature is integral to quick shape recovery and fixity. Differential scanning calorimetry results indicate that addition of core nanoparticles as netpoints leads to the reduction in the transition temperature and crystallinity of the hybrid shape memory polymer material compositions as compared with a free polymer material. While not limiting the embodiments, this observation may plausibly be understood by a perception that polymer chains may be more constrained due to immobilization of both the polymer chain ends.

FIG. 2(c) shows dynamic mechanical analysis (DMA) spectra graphs for the hybrid shape memory polymer material compositions in accordance with the embodiments prepared using a range of canopy polymer molecular weight and canopy polymer chemical composition. The spectra graphs as illustrated in FIG. 2(c) show that a modulus and a transition temperature may be tuned over a wide range by changing the canopy polymer molecular weight, the canopy polymer chemical composition and the shape memory polymer material composition inorganic core nanoparticle volume percent content. FIG. 2(c) also illustrates that the canopy polymer chemical composition for shape memory polymer material compositions in accordance with the embodiments is not limited to polyethylene glycol polymer canopy materials, but rather shape memory polymer material compositions predicated upon a polydimethylsiloxane (PDMS) canopy polymer material composition are also feasible. It is also apparent from FIG. 2(c) that both a storage modulus and a transition temperature may be facilely adjusted by changing a canopy polymer molecular weight or a canopy polymer chemical composition. Within the context of the data as illustrated in FIG. 2(c), for the polyethylene glycol based canopy polymer materials a transition temperature corresponds with a melting transition, whereas for the polydimethylsiloxane based canopy polymer material the transition temperature corresponds with a glass transition.

Shape memory polymer material compositions may in general suffer from deteriorated shape memory performance upon addition of reactive or non-reactive inorganic core nanoparticles as fillers. This observation has been speculated to stem from structural defects in a network produced by the inorganic core nanoparticle fillers, which reduces the network homogeneity and polymer chain (i.e., strand) connectivity. Nanoparticle fillers have also been reported to form larger aggregates, which degrades the stimuli responsiveness of shape memory polymer material compositions. Desirably, none of these drawbacks are seen in the hybrid shape memory polymer material compositions in accordance with the embodiments, presumably since the very inorganic core nanoparticles which provide mechanical reinforcement act as netpoints for the cross-linked networks within the context of a switching segment and cannot aggregate because they are chemically integrated into the polymer network.

Figure 3:
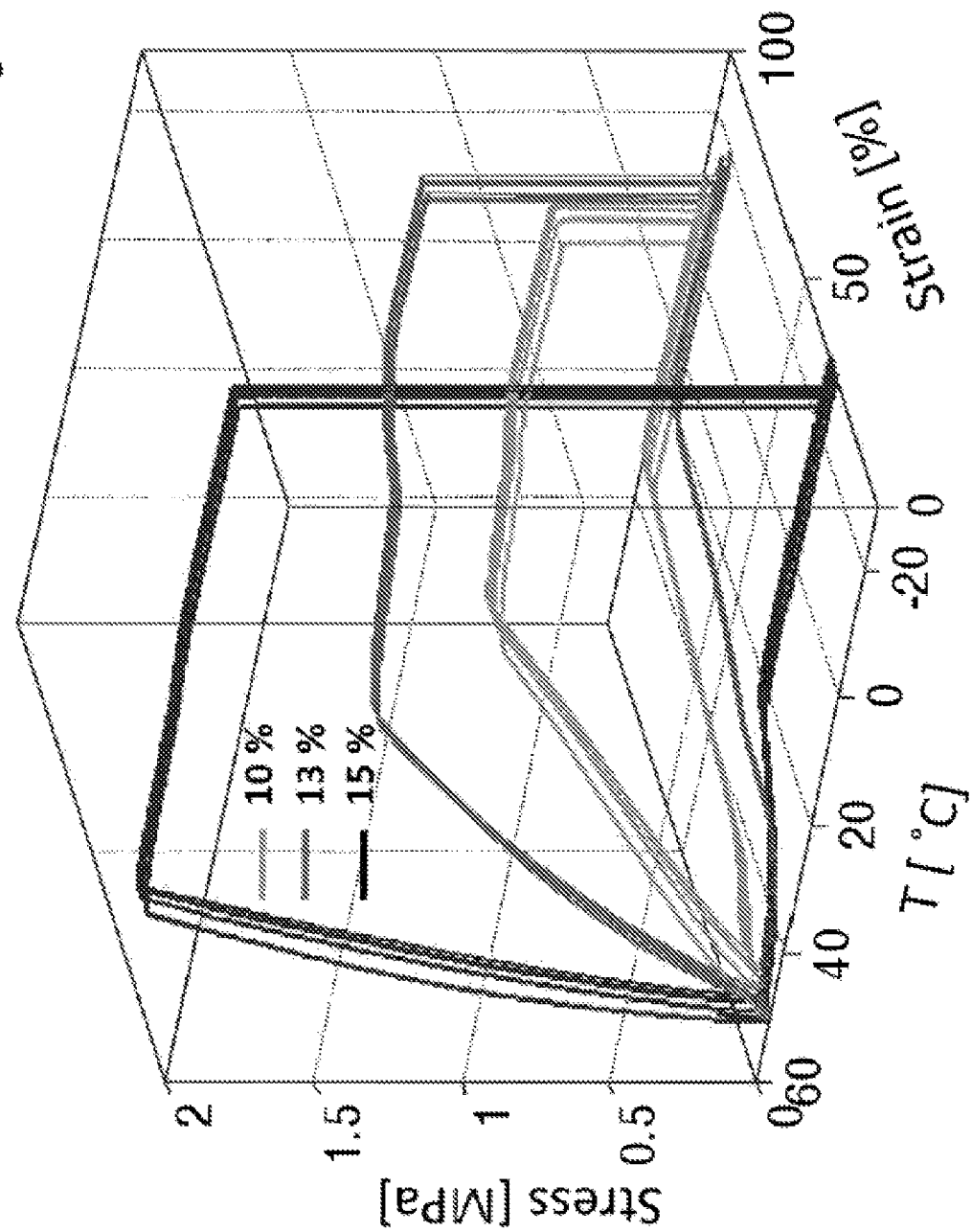
FIG. 3 shows a cyclic thermo-mechanical analysis three dimensional spectrum of Stress and Strain characteristics as a function of Temperature and further as a function of inorganic core nanoparticle volume fraction for a plurality of shape memory polymer material compositions in accordance with the embodiments, generally as illustrated in FIG. 2(a).

The shape memory performance of shape memory polymer material compositions whose dynamic mechanical analysis spectra are illustrated in FIG. 2(a) were evaluated using cyclic thermo mechanical analysis (i.e., Stress versus Strain as a function of Temperature and further as a function of inorganic core nanoparticle volume percent) as shown in FIG. 3. In these evaluations, a particular shape memory polymer material composition in accordance with the embodiments was first stretched at a temperature higher than $T_{trans}$ and then cooled below $T_{trans}$ at fixed stress to fix the shape of the shape memory polymer material composition. Stress was then reduced to zero and the strain decay during this step was used to characterize the shape fixity. It is apparent from FIG. 3 that there is no noticeable decay in the strain, implying that these materials have good shape fixity.

For the shape memory polymer material composition shape recovery, the particular shape memory polymer material composition was then heated to a temperature above $T_{trans}$ and its shape recovery characterized from the corresponding strain recovery under stress free conditions. It can be seen from FIG. 3 that during this process the strain recovers almost fully, implying that these materials are able to recover to their original shape. This process is repeated for multiple cycles, desirably demonstrating that the shape memory polymer material compositions in accordance with the embodiments possess good shape fixity and recovery after multiple cycles of loading and unloading. Within FIG. 3, the 15% volume silica inorganic core nanoparticle loading corresponds with the highest stress, the 13% volume silica inorganic core nanoparticle loading corresponds with the intermediate stress and the 10% volume silica inorganic core nanoparticle loading corresponds with the lowest stress.

Values for the shape fixity and recovery ratios are provided in Table I for the shape memory polymer material compositions investigated in accordance with the foregoing embodiments.

TABLE I

| Volume Fraction (%) | $T_c$ [° C.] | $T_m$ [° C.] | $E_g$ [GPa] | $E_f$ [MPa] | $R_f$ (%) | $R_r$ (%) |
|---|---|---|---|---|---|---|
| 10 | 15 | 43 | 1.9 | 1.6 | 98.5 | 98.3 |
| 13 | 8 | 38 | 3.2 | 4.9 | 99.5 | 99.4 |
| 16 | 8 | 37 | 4.8 | 126 | 97 | 96.8 |

$M_w$ is the molecular weight of the corona.
$T_c$ the crystallization temperature of PEG chains determined from DSC.
$T_m$ is the melting temperature of PEG chains determined from DSC.
$E_g$ is the glassy modulus determined from DMA.
$E_f$ is the rubbery modulus determined from DMA.
$R_f$ is the shape fixity ratio.
$R_r$ is the shape recovery ratio.

In conclusion, disclosed and described herein is a materials platform for preparing inorganic-organic hybrid shape memory polymer material compositions. The shape memory polymer material compositions incorporate inorganic core nanoparticles as netpoints in a cross-linked polymer network that serves as a switching segment, and thereby appears to overcome many of the shortcomings of conventional hybrid shape memory polymer material compositions that may be prepared by a physical dispersion of inorganic nanostructures/filler particles in a polymer network. This change for preparation of a shape memory polymer material composition in accordance with the embodiments leads to significant increases in the elastic modulus, as well as sharp transition temperatures and excellent shape memory properties. One may attribute these benefits to the observation that materials processing and compatibility issues stemming from immiscibility of physically incorporated filler inorganic core nanoparticles in a polymer matrix may inherently be avoided by bonding and tethering the polymers to the filler inorganic core nanoparticles in accordance with shape memory polymer materials compositions in accordance with the embodiments. These shape memory polymer materials compositions in accordance with the embodiments thus provide a design opportunity for strong, biocompatible shape memory polymer materials with continuously tunable mechanical properties and transition temperatures, as well as high shape memory performance.

Furthermore, by taking advantage of the large available libraries of nanoparticle shapes, sizes, chemistries, and mass distributions (e.g. hollow, rattles, core-shell), shape memory polymer material compositions in accordance with the embodiments may provide a facile framework for creating shape memory polymer material compositions with multifunctional features, such as but not limited to remote actuation properties, biodegradability properties and therapeutic release properties.

Figure 4:
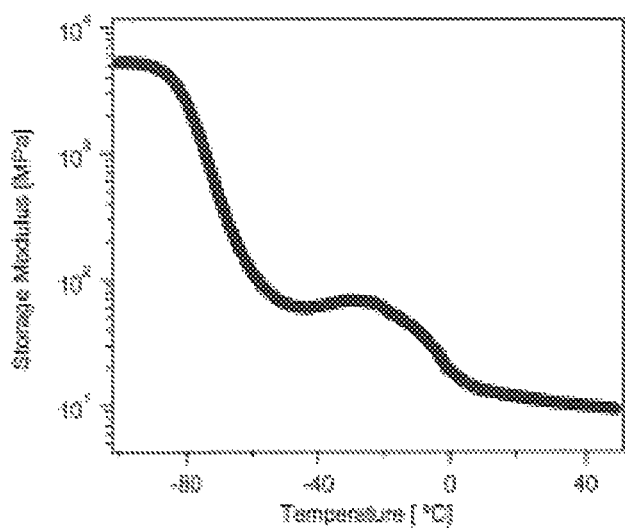
FIG. 4 shows a dynamic mechanical analysis (DMA) spectrum of Storage Modulus versus Temperature for a lithium-bis(trifluoromethanesulfonyl) imide (LiTFSI) doped shape memory polymer material composition in accordance with an enhanced embodiment.

IV. Lithium Doped Shape Memory Polymer Material Composition Films for Lithium Battery Applications FIG. 4 shows a dynamic mechanical analysis spectrum for a lithium bis-(trifluoromethanesulfonyl) imide (LiTFSI) doped shape memory polymer material composition film in accordance with the foregoing embodiments. This particular doped shape memory polymer material composition included a 10% volume fraction of ca. 10 nanometer particles in accordance with description above, further in conjunction with a 0.25 M doping using bis-(trifluoromethanesulfonyl) imide (LiTFSI). It can be seen from FIG. 4 that a room temperature elastic modulus of the doped shape memory polymer material composition network film is close to 10 MPa. The first-generation cross-linked hybrid shape memory polymer material compositions in accordance with the embodiments as described above may be designed to function as electrolytes and separators for lithium ion batteries and lithium metal batteries (i.e., lithium ion batteries that employ metallic lithium as an anode).

Within this context, a successful separator must possess at least four characteristics. First, it must be an electrical insulator. Second, it must be easily wettable and its pores must be easily permeated by electrolyte material compositions and lithium ions. Third, it should significantly retard or stop dendrites from growing at current densities 5-10 times higher than the allowed battery charging rate set by an external control circuit. Fourth, it must have good mechanical properties throughout a range of temperatures where a battery is expected to operate, and must maintain mechanical integrity over extensive periods of immersion in an electrolyte.

To achieve these four characteristics, the mechanical and electrochemical properties of the cross-linked, hybrid shape memory polymer material compositions in accordance with the embodiments described above as a base material may be enhanced significantly by incorporating three modifications.

First, hydrophobic oligomers (e.g. polydimethylsiloxane (PDMS), poly(methylmethacrylate) (PMMA), poly(vinylidene fluoride) (PVDF), polystyrene (PS), polypropylene (PP), or polyethylene (PE)) may be incorporated at a volume fraction from about 1% to about 50% or more preferably from about 1% to about 10% as a minority phase in forming cross-links between the inorganic core nanoparticles (i.e., through canopy components) within a shape memory polymer material composition in accordance with these enhanced embodiments. These types of cross-links are advantageous insofar as they limit swelling of a separator in the presence of a wetting electrolyte, allowing a designed inorganic core nanoparticle netpoint and polymer switching segment network structure to be maintained.

Second, taking advantage of the large number of reserve sulfonic acid groups on the corona modified inorganic core nanoparticles may be desirable to provide a reservoir of lithium ions in a particular separator. This particular modification may improve ionic conductivity and enhance an overall lithium transference number of an electrolyte system (i.e., an electrolyte and a separator) in accordance with these enhanced embodiments.

Third, lowering a molecular weight of the polymer cross-links (i.e., to a range from about 50 to about 100000 amu, more preferably from about 100 to about 10000 amu and yet more preferably from about 500 to about 5000 amu) may also be desirable. This simultaneously increases the particle volume fraction and lowers the molar volume of the cross-links. Both factors decrease the pore size and increase the turtuosity of the porous network, and hence enhance the mechanical modulus of the separator.

Figure 5:
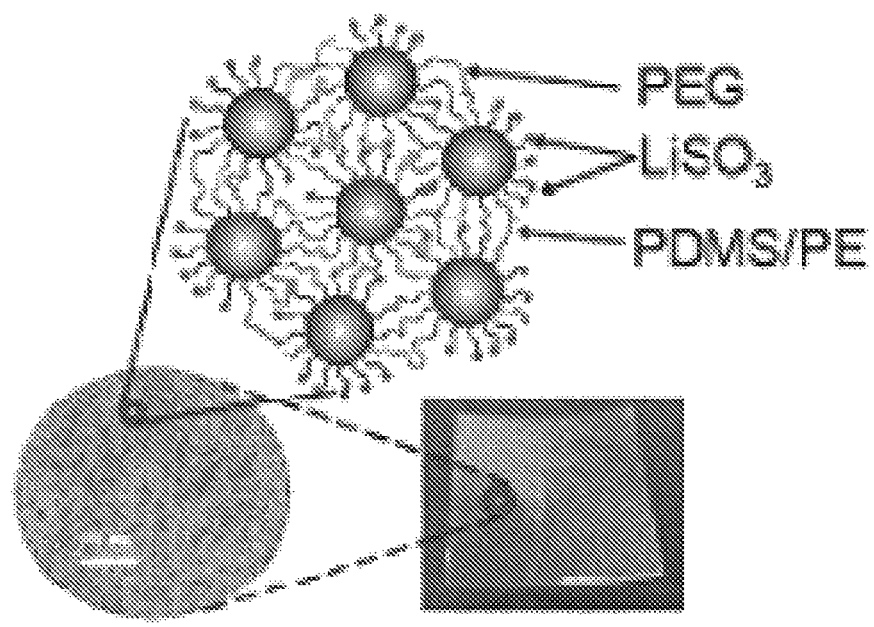
FIG. 5 shows sequential schematic diagrams of a shape memory polymer material composition in accordance with the embodiments designed and engineered specifically for application within the context of a lithium battery electrolyte or separator.

The resultant second generation hybrid electrolyte/separator including details of its configuration are illustrated in FIG. 5. In a properly optimized form, it is anticipated to yield significant improvements in the ionic conductivity of the materials as well as in their ability to mitigate against lithium dendrite growth and proliferation upon cycling lithium ion and lithium metal batteries. One may also anticipate that the presence of a hydrophobic polymer component will provide an additional level of tunability for preventing adventitious lithium polysulfides migration in high energy lithium-sulfur rechargeable battery configurations, in which such migration is known to promote fouling of an anode, compromising energy storage capacity of a lithium battery.

One embodiment of the materials utilizes sulfonic acid functionalized inorganic core nanoparticles as the starting materials for further synthesis. In aqueous solution, these nanoparticles are first treated with lithium hydroxide to convert some (i.e., from about 1 to about 80%, and more preferably from about 20 to about 75% of the sulfonic acid groups (>1,000 per particle) into lithium salts. By reacting the remaining sulfonic acid groups with mixtures of $\alpha$-amino-$\omega$-hydroxy terminated polyethylene glycol and an $\alpha$-amino-$\omega$-hydroxy terminated polydimethylsiloxane/polyethylene (PDMS/PE) with varying compositions, lithiated hybrid inorganic core nanoparticles bearing mixtures of cross-linkable polyethylene glycol and polydimethylsiloxane/polyethylene polymer chains may be created. These polymer chains may be cross-linked using hexamethylene diisocyanate and the final product washed to remove any unlinked polymer chains.

Cross-linked hybrid separator films with good lithium ion conductivities may be produced by soaking the material synthesized in the previous step in a large excess of liquid electrolyte solution, such as 1M LiTFSI in low molecular weight PEG, TEGDME, organic carbonates (e.g. ethylene carbonate, propylene carbonate), ionic liquids (e.g. methyl butyl pyrrolidinium bis(trifluoromethanesulfonyl)imide), or mixtures thereof in a glove box. By varying the relative compositions of the three species (LiOH, PEG, and PDMS/PE) electrochemically stable separator materials with vastly different ionic conductivity, pore structure, wettability, lithium ion transference numbers, mechanical properties, and abilities to mitigate dendrite growth may be fabricated. In addition to a direct benefit for enhancing safety and performance of a Li—S battery technology, one may anticipate that these materials may find use in all lithium-based (lithium ion and lithium metal) secondary battery configurations.

Additionally, the cost metrics and versatility of the materials may be significantly manipulated by substituting the initial sulfonic acid groups used as polymer anchor points for the shape memory polymer material compositions in accordance with the above embodiments with lower-cost ligands (e.g., amine, hydroxyl, acid chloride, acyl halide, carboxylic acid, aldehyde) bearing reactive functional groups. Prior to or at the same time as the ligands are tethered to the inorganic core nanoparticles, ionic lithium sites may be introduced by reaction with lithium hydroxide. The reactive groups present on the resultant lithiated nanoparticles may be reacted with polymers bearing complementary functional groups to produce electrolytes or separators with tunable mechanical and electrochemical properties.

V. Experimental Methods and Materials

1. Preparation of Corona Functionalized Silica Nanoparticles and Canopy Functionalized Silica Nanoparticles Commercially available silica inorganic core nanoparticle suspensions (LUOOX-SM30) (Sigma Aldrich) were diluted and used to synthesize sulphonic acid surface functionalized coronas which were attached to the silica inorganic core nanoparticles by reaction of silanol groups on 3-(trihydroxysilyl)-1-propanesulfonic acid (Gelest) with the large amounts of hydroxyl groups present on the particles in aqueous solution. To ensure dense surface coverages, the 3-(trihydroxysilyl)-1-propanesulfonic acid was added dropwise, in a large excess at pH 2. These conditions favor the anchoring reaction. The excess (un-tethered) silane was removed after completion of the reaction using dialysis (snake skin dialysis tubings, Pierce Scientific) against deionized water. The functionality of the resultant sulfonic acid-derivatized $SiO_2$ nanoparticles was determined by titrating against a standard solution of NaOH.

$\alpha$-amino-$\omega$-hydroxy terminated polyethyleneglycol (Polymer Source, Inc.) was added to the resultant sulfonic acid surface functionalized silica inorganic core nanoparticles and the mixture was allowed to react for a few days. The amine end groups of the polyethyleneglycol polymer reacted with the surface sulfonic acid groups on the sulfonic acid corona surface functionalized silica inorganic core nanoparticles and the product thus comprised polyethyleneglycol canopy tethered silica core nanoparticles through a sulfonamide chemical linkage as a second linkage with free hydroxyl groups at the exposed polyethylene glycol chain ends. The product from this reaction was dried and the excess polymer removed by repeated precipitation from chloroform using hexane.

To synthesize hybrid shape memory polymer material compositions using polydimethylsiloxane, a similar method was employed with a diamino functionalized polydimethylsiloxane (Sigma Aldrich) and the purification was done by precipitation with methanol. The inorganic core nanoparticle weight fraction in all materials was characterized by thermogravimetric analysis (TGA).

2. Preparation of Shape Memory Polymer Material Compositions

To prepare shape memory polymer material compositions using silica inorganic core nanoparticles as netpoints, the purified product from the preceding steps was dissolved in chloroform and reacted with excess hexamethylenediisocyanate (HDI) (Sigma Aldrich) to cross-link the tethered polymer chains that comprised the hydroxyl surface functional canopy components. The resultant solution was poured into Teflon molds and the solvent evaporated by slowly heating at 70 degrees Celsius.

3. Shape Memory Polymer Material Characterization:

Rectangular films cut from the material produced in the preceding step were used to measure the elastic modulus as a function of temperature. In a typical experiment, the material was cooled at a rate of 3 degrees Celsius per minute and a small deformation applied at a frequency of 1 Hz. Differential scanning calorimetry was performed in heat/cool/heat cycle at a heating and cooling rate of 5 degrees Celsius per minute from a temperature range of 100 degrees Celsius to −50 degrees Celsius.

Shape memory performance was evaluated using a cyclic thermomechanical test performed in the stress control mode. In this test, samples were stretched up to a specified strain at 50 degrees Celsius, and the stress maintained constant as the sample is cooled to −20 degrees Celsius for the 10% volume fraction sample and the 13% volume fraction sample, and −30 degrees Celsius for the 16% volume fraction sample. The shape fixity was evaluated from the decrease in the value of strain under stress free conditions. Shape recovery was quantified from the recovery of strain during heating to 50 degrees Celsius under stress free conditions.

4. Instrumentation:

Dynamic mechanical analysis (DMA) was performed using a TA instrument model Q800 tensile tester outfitted with a tension clamp. Differential scanning calorimetry (DSC) experiments were carried out using a TA instruments model Q2000 differential scanning calorimeter based on a heat/cool/heat cycle with liquid nitrogen as coolant. Thermal Gravimetric Analysis (TGA) was performed using TA instruments model Q5000 under nitrogen flow. To facilitate transmission electron microscopy (TEM) imaging, samples were sectioned using a Leiea Ultracut-UCT microtome and transmission electron microscopy imaging was performed using an FEI Technai T12 apparatus at 120 kV.

All references, including publications, patent applications, and patents cited herein are hereby incorporated by reference in their entireties to the extent allowed and as if each reference was individually and specifically indicated to be incorporated by reference and was set forth in its entirety herein.

The use of the terms "a" and "an" and "the" and similar referents in the context of describing the embodiments (and also within the context of the following claims) is to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

The term "connected" is to be construed as partly or wholly contained within, attached to, or joined together, even if there is something intervening.

The recitation of ranges of values herein is merely intended to serve as a shorthand method of referring individually to each separate value falling within a range, unless otherwise indicated herein, and each separate value is incorporated into the specification as if it was individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A material composition comprising:
   a plurality of inorganic core nanoparticles, each inorganic core nanoparticle having a capacity to serve as a netpoint for greater than eight polymer chains within a polymer network as a switching segment; and
   the polymer network bonded to the plurality of inorganic core nanoparticles and comprising:
      a corona component bonded to each inorganic core nanoparticle through a first chemical linkage selected from the group consisting of siloxane linkages, ester linkages, epoxide linkages, urea linkages, amide linkages, sulfonamide linkages and urethane linkages;
      a canopy component bonded to each corona component through a second chemical linkage; and
      a plurality of cross-linking components cross-linking between separate canopy components on separate inorganic core nanoparticles through a third chemical linkage.

2. The material composition of claim 1 wherein the plurality of inorganic core nanoparticles is selected from the group consisting of metal, metal alloy, metal oxide, metal hydroxide, metal nitride, metal oxynitride, metal boride, metal boronitride, metal sulfide and metal fluoride nanoparticles.

3. The material composition of claim 1 wherein the plurality of inorganic core nanoparticles comprises silica nanoparticles.

4. The material composition of claim 1 wherein each of the plurality of inorganic core nanoparticles has a diameter from about 5 to about 1000 nanometers.

5. The material composition of claim 1 wherein the corona component comprises a reaction product of an alkoxysilane coupling agent.

6. The material composition of claim 1 wherein the canopy component comprises a reaction product of an alkanol amine.

7. The material composition of claim 1 wherein the plurality of cross-linking components comprise reaction products of a diisocyanate material.

8. The material composition of claim 1 wherein the first chemical linkage, the second chemical linkage and the third chemical linkage are each independently selected from the group consisting of siloxane linkages, ester linkages, epoxide linkages, urea linkages, amide linkages, sulfonamide linkages and urethane linkages.

9. The material composition of claim 8 wherein each of the first chemical linkage, the second chemical linkage and the third chemical linkage is a different chemical linkage.

10. The material composition of claim 1 wherein the plurality of inorganic core nanoparticles comprises from about 1 to about 50 percent by volume of the material composition.

11. The materials composition of claim 1 wherein the plurality of inorganic core nanoparticles consists essentially of an inorganic material.

12. A battery component comprising a material composition comprising:
    a plurality of inorganic core nanoparticles, each inorganic core nanoparticle having a capacity to serve as a netpoint for greater than eight polymer chains within a polymer network as a switching segment; and
    the polymer network bonded to the plurality of inorganic core nanoparticles and comprising:
        a corona component bonded to each inorganic core nanoparticle through a first chemical linkage selected from the group consisting of siloxane linkages, ester linkages, epoxide linkages, urea linkages, amide linkages, sulfonamide linkages and urethane linkages;
        a canopy component bonded to each corona component through a second chemical linkage; and
        a plurality of cross-linking components cross-linking between separate canopy components on separate inorganic core nanoparticles through a third chemical linkage.

13. A battery including a battery component comprising a material composition comprising:
    a plurality of inorganic core nanoparticles, each inorganic core nanoparticle having a capacity to serve as a netpoint for greater than eight polymer chains within a polymer network as a switching segment; and
    the polymer network bonded to the plurality of inorganic core nanoparticles and comprising:
        a corona component bonded to each inorganic core nanoparticle through a first chemical linkage;
        a canopy component bonded to each corona component through a second chemical linkage; and
        a plurality of cross-linking components cross-linking between separate canopy components on separate inorganic core nanoparticles through a third chemical linkage.

14. The battery of claim 13 wherein the battery is selected from the group consisting of a lithium ion battery and a lithium metal battery.

15. The battery of claim 14 wherein the battery component is selected from the group consisting of an electrolyte and a separator.

16. A battery including a battery component comprising a material composition comprising:
    a plurality of inorganic core nanoparticles, each inorganic core nanoparticle having a capacity to serve as a netpoint for greater than eight polymer chains within a polymer network as a switching segment; and
    the polymer network bonded to the plurality of inorganic core nanoparticles and comprising:
        a corona component bonded to each inorganic core nanoparticle through a first chemical linkage;
        a canopy component bonded to each corona component through a second chemical linkage;
        a plurality of cross-linking components cross-linking between separate canopy components on separate inorganic core nanoparticles through a third chemical linkage; and
        a lithium ion dopant doping a portion of the corona component.

17. A battery including a battery component comprising a material composition comprising:
    a plurality of inorganic core nanoparticles, each inorganic core nanoparticle having a capacity to serve as a netpoint for greater than eight polymer chains within a polymer network as a switching segment; and
    the polymer network bonded to the plurality of inorganic core nanoparticles and comprising:
        a corona component bonded to each inorganic core nanoparticle through a first chemical linkage;
        a canopy component bonded to each corona component through a second chemical linkage the canopy component comprising both a hydrophilic polymer component and a hydrophobic polymer component; and
        a plurality of cross-linking components cross-linking between separate canopy components on separate inorganic core nanoparticles through a third chemical linkage.

18. A battery including a battery component comprising a material composition comprising:
    a plurality of inorganic core nanoparticles, each inorganic core nanoparticle having a capacity to serve as a netpoint for greater than eight polymer chains within a polymer network as a switching segment; and
    the polymer network bonded to the plurality of inorganic core nanoparticles and comprising:
        a corona component bonded to each inorganic core nanoparticle through a first chemical linkage;
        a canopy component bonded to each corona component through a second chemical linkage; and
        a plurality of cross-linking components cross-linking between separate canopy components on separate inorganic core nanoparticles through a third chemical linkage,
    wherein each of the plurality of cross-linking components has a molecular weight from about 50 to about 100000 amu.

19. A method for preparing a material composition comprising:
    reacting a plurality of inorganic core nanoparticles with a corona forming material to provide a plurality of surface functional corona bonded inorganic core nanoparticles that include a first chemical linkage linkage selected from the group consisting of siloxane linkages, ester linkages, epoxide linkages, urea linkages, amide linkages, sulfonamide linkages and urethane linkages;
    reacting the plurality of surface functional corona bonded core nanoparticles with a canopy forming material to provide a plurality of surface functional corona bonded and surface functional canopy bonded inorganic core nanoparticles that include a second chemical linkage in addition to the first chemical linkage; and reacting the plurality of surface functional corona bonded and surface functional canopy bonded inorganic core nanoparticles with a cross-linking material to provide cross-linked surface functional corona bonded and surface functional canopy bonded inorganic core nanoparticles through a third chemical linkage.

20. The method of claim 19 wherein:

the first chemical linkage comprises a siloxane linkage;

the second chemical linkage comprises a sulfonamide linkage; and the third chemical linkage comprises a urethane linkage.

21. The method of claim 19 wherein the plurality of inorganic core nanoparticles comprises an inorganic material selected from the group consisting of is selected from the group consisting of metal, metal alloy, metal oxide, metal hydroxide, metal nitride, metal oxynitride, metal sulfide, metal fluoride, metal boride and metal boronitride inorganic materials.

22. The method of claim 19 wherein the plurality of inorganic core nanoparticles comprises a silica material.

23. The method of claim 19 wherein the first chemical linkage, the second chemical linkage and the third chemical linkage comprise different chemical linkages.

24. The method of claim 19 wherein at least two of the first chemical linkage, the second chemical linkage and the third chemical linkage comprise the same chemical linkage.

* * * * *